United States Patent [19]

Kugler

[11] 3,944,913
[45] Mar. 16, 1976

[54] SYSTEM FOR EFFECTING TAP CHANGES OF TAPPED TRANSFORMER WINDINGS BY MEANS OF THYRISTORS

[75] Inventor: Kurt Kugler, Lappersdorf, Germany

[73] Assignee: Mashinenfabrik Reinhausen Gebruder Scheubeck K. G., Regensburg, Germany

[22] Filed: May 19, 1975

[21] Appl. No.: 579,115

[30] Foreign Application Priority Data
June 1, 1974    Germany............................ 2426638

[52] U.S. Cl............. 323/43.5 S; 317/11 E; 317/16; 307/136
[51] Int. Cl.²...................... G05F 1/20; H02M 5/12
[58] Field of Search ................... 323/24, 40, 43.5 S; 307/130, 134, 136; 317/11 E, 14 B, 16

[56] References Cited
UNITED STATES PATENTS 3,662,253   5/1972   Yamamoto et al............. 323/43.5 S
3,706,024   12/1972  Wood .............................. 323/43.5 S
3,728,611   4/1973   Elvin................................ 323/43.5 S
3,786,337   1/1974   Kugler ............................ 323/43.5 S FOREIGN PATENTS OR APPLICATIONS
1,438,592   1/1969   Germany ........................ 323/43.5 S

*Primary Examiner*—Gerald Goldberg
*Attorney, Agent, or Firm*—Erwin Salzer

[57]     ABSTRACT

Tap-changing means for tapped transformers include thyristors for effecting tap-changes. Additional tap-changing means which include electric fuses, current-limiting resistors and a relay-controlled standby thyristor trigger system prevent the occurrence of dangerous short-circuit currents in case of malfunction of the principal thyristor trigger means. The circuitry further includes a pair of voltage bucking relays energized by a pair of voltage sensors responsive to the voltage prevailing between the taps of the transformer winding between which a tap-changing operation is intended.

2 Claims, 1 Drawing Figure

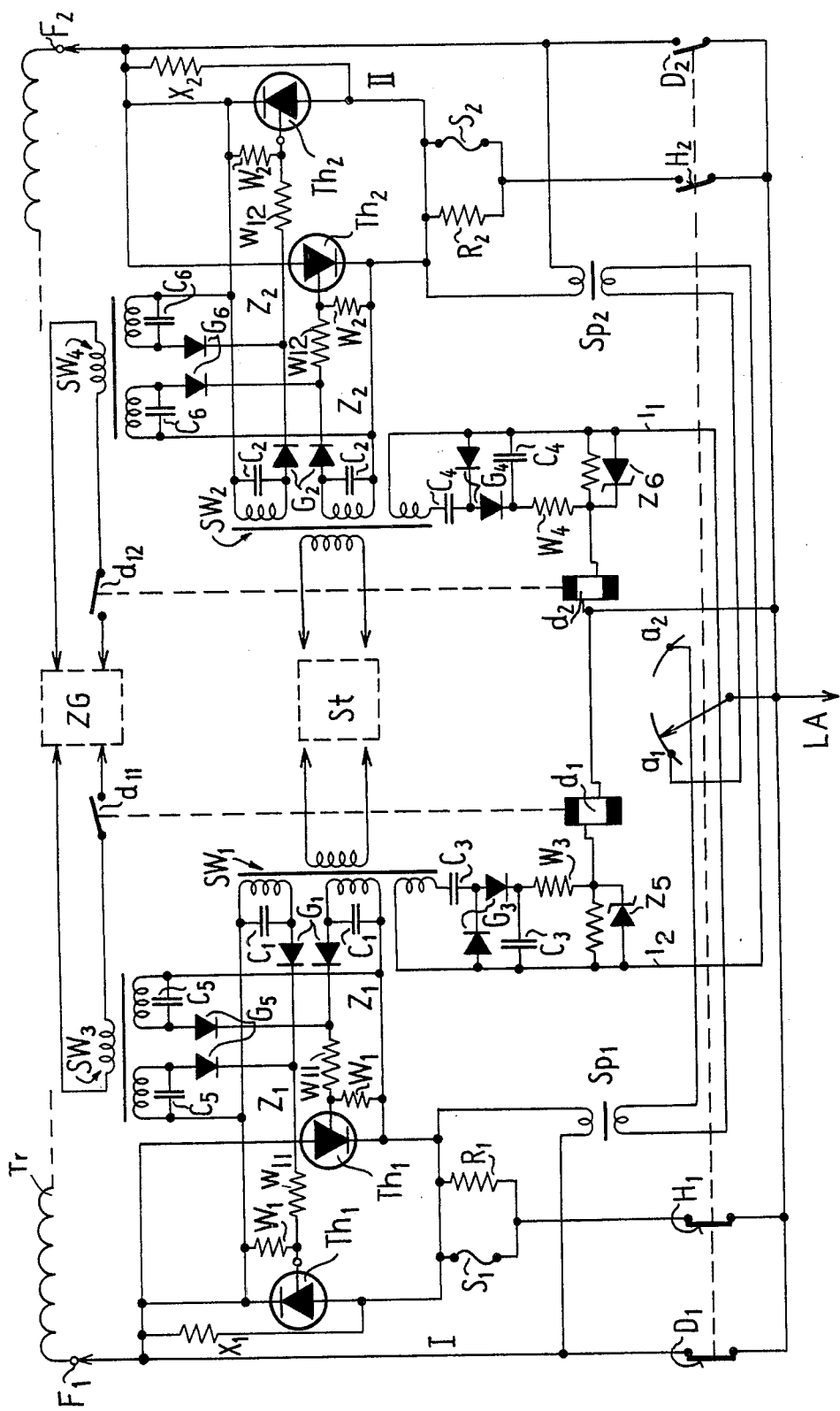

SYSTEM FOR EFFECTING TAP CHANGES OF TAPPED TRANSFORMER WINDINGS BY MEANS OF THYRISTORS

BACKGROUND OF THE INVENTION

The present invention relates to an improvement of the system disclosed in U.S. Pat. No. 3,786,337; 01/15/74 for THYRISTORS FOR EFFECTING TAP CHANGING ON TRANSFORMERS AND INCLUDING CURRENT LIMITING RESISTORS AND STANDBY TRIGGER SYSTEM, assigned to the same assignee as the present invention.

Prior art tap-changing systems include a transformer winding having at least two taps. Either of the two taps may be connected selectively to an outgoing current-carrying line. The connection between the taps and the aforementioned line is normally effected by current-carrying contacts forming part of a transfer switch. The latter includes also disconnect contacts. The current-carrying contacts can be shunted by a pair of thyristor networks which are arranged in series with the aforementioned disconnect contacts. Each thyristor network includes a pair of inverse parallel-connected thyristors.

In the stationary state, i.e. when the load current is derived only from one of two contiguous taps of a tapped transformer winding and the other tap does not supply any load current, one of two pairs of current-carrying contacts of the transfer switch carries the entire load current, and no other contact of the transfer switch is current carrying. In that stationary state the constituent thyristors of the two thyristor networks are not triggered and, therefore, non-conductive.

A tap-change involves the following steps in the order stated below:

One of the two pairs of disconnect contacts is closed — if it had not been closed previously — to prepare a current path shunting the pair of engaged current-carrying contacts which at the time is carrying the load current. That current path includes one of the two thyristor networks, or the first thyristor network. After triggering of the constituent thyristors of the first thyristor network the load current flows through that thyristor network and the closed disconnect contacts arranged in series with it. Hence the current-carrying contacts by which the load current had heretofore been carried may safely be separated, and are separated. Thereupon the disconnect contacts arranged in series with the other or second thyristor network are closed and the constituent thyristors of said second thyristor network triggered, and no further trigger pulses are applied to constituent thyristors of said first thyristor network. As a result, both thyristor networks will be conductive during a short period of time, and the first thyristor network becomes non-conductive following the first zero of the current wave. Now the entire load current is carried by the second thyristor network and by the disconnect contacts that are arranged in series with it. The last step in the process of a tap-change consists in shunting the second thyristor network by closing a pair of current-carrying contacts of the transfer switch, and thereafter deactivating the second thyristor network by interrupting the supply of trigger pulses to it. Now a new stationary state is reached, i.e. the entire load current is derived from the tap that heretofore had been inactive, and the tap that heretofore had supplied the entire load current is now inactive.

The required sequence of operations may be achieved with special transfer switches which are well known in the art. This sequence of operations may also be achieved with any Jansen type transfer switch for tap-changing regulating transformers by resorting to the auxiliary control means disclosed and claimed in U.S. Pat. No. 3,710,232 to M. Matzl, Jan. 9, 1973 for LOGIC-CONTROLLED THYRISTOR SYSTEM FOR PERFORMING TAP-CHANGING OPERATIONS.

What has been described above is a faultless operation of the kind of system under consideration. Such systems may, however, malfunction under certain circumstances.

One of the most dangerous situations results when by malfunctioning of one part or another the thyristors of both thyristor networks are triggered simultaneously. This results in a solid short-circuit of that section of the tapped transformer winding which is connected to the two simultaneously triggered thyristor networks.

The above situation resulting from malfunctioning of the trigger means may be remedied by arranging in series with each of the two thyristor networks a current-limiting resistor which is shunted by an electric fuse. In such a system simultaneous triggering of the thyristors in both thyristor networks results in blowing of the shunt fuse across one or across both current-limiting resistors. These resistors then limit the fault current to a relatively low level. This makes it possible to continue operation of the faulted system for some time during which the fault may be detected and repaired, and the blown fuse, or fuses, replaced.

The constituent thyristors of one, or the other, or of both thyristor networks may not be triggered at the time when they should be triggered.

Considering the case that no trigger pulses are supplied to the thyristors of the first thyristor network supposed to shunt the then engaged current-carrying contacts at the beginning of a tap-changing operation. As a result, an arc is drawn between the current-carrying contacts when they are caused to part. The current-carrying contacts are not designed to withstand arcing and are, therefore, damaged by the arc which is drawn between them. A tap-changing operation involving arcing between parting current-changing contacts may also result in a complete destruction of an on load tap-changing regulating transformer.

The circuitry disclosed and claimed in the above referred-to U.S. Pat. No. 3,786,337 provides means for precluding damage to a tap-changing system of the kind under consideration in case of a failure of the thyristor triggering means and consequent current commutation failure. This is achieved by the provision of standby, or auxiliary, thyristor trigger means under the control of relay means which are energized by means of auxiliary switch means tied to, and jointly operative with, the parting current-carrying contacts of the transfer switch in case that the load current is not commutated from the current path including current-carrying contacts to a current path including a thyristor network.

The invention to which U.S. Pat. No. 3,786,337 relates is thus based on the reasoning that it is necessary to determine initially whether a thyristor network is ready to commutate the load current from the current path including current-carrying contacts which are about to part, or which have already parted, and that the further operation of the system should be made dependent upon the outcome of such initial determination. In case that the aforementioned thyristor network is not ready for its commutating or current-carrying duty it should be triggered by stand-by, or auxiliary, trigger means.

The present invention relates to an improvement of the system of U.S. Pat. No. 3,786,337 and more particularly to an improvement of the embodiment thereof shown in FIG. 3 of the above patent.

As will be shown below in detail a tap-changing operation in the above prior art system may not be properly performed under certain small load-current conditions. It is the prime object of the present invention to provide a novel tap-changing system not subject to small-load current limitations under consideration.

BRIEF DESCRIPTION OF THE DRAWING

The drawing is a circuit diagram of a system embodying the present invention predicated upon bucking of two voltages and including a primary trigger pulse generator and a standby, or auxiliary trigger pulse generator.

DESCRIPTION OF PREFERRED EMBODIMENT

Referring now to the drawing, reference character Tr has been applied to indicate a tapped winding of a regulating transformer having taps $F_1$ and $F_2$. Reference character LA has been applied to indicate an outgoing line carrying the load current from tap $F_1$ by way of internal line I and the current-carrying contacts $D_1$ of a mechanical switching device to a given load (not shown). The aforementioned switching device includes in addition to current-carrying contact $D_1$ current-carrying contact $D_2$ and the auxiliary or disconnect contacts $H_1$, $H_2$. In the limit position of the switching device shown contacts $D_1$, $H_1$ are closed, and coantacts $H_2$, $D_2$ are open, and the current in line LA is solely derived from tap $F_1$. The switching device has two limit positions of which one is shown in the drawing. In the other limit position of the switching device contacts $D_1$, $H_1$ are open and contacts $H_2$, $D_2$ closed. Then the entire load current flowing in outgoing line LA is derived from tap $F_2$ and its path includes internal line II and current-carrying contacts $D_2$. The term current-carrying contacts is applied to contacts $D_1$, $D_2$ to indicate that these contacts are designed to carry high currents continuously, but are not capable of interrupting or breaking currents, and to withstand arcing.

Reference character $Th_1$ has been applied to indicate a first pair of inverse parallel connected thyristors, and reference character $Th_2$ has been applied to indicate a second pair of inverse parallel connected thyristors. One terminal of the network including thyristor $Th_1$ is conductively connected to tap $F_1$, and the other end of that network is connected by means of auxiliary contacts $H_1$ to outgoing load line LA. In a like fashion one terminal of the network including inverse parallel connected thyristors $Th_2$ is conductively connected to tap $F_2$, and the other end of that network is connected by means of auxiliary contacts $H_2$ to outgoing load line LA. The aforementioned thyristor networks serve the purpose of selectively switching load line LA from tap $F_1$ to tap $F_2$, and vice versa. As mentioned above contacts $H_1$, $H_2$ are in effect disconnects. As shown in FIG. 1 disconnect $H_1$ is closed preparatory to a tap-changing operation from tap $F_1$ to tap $F_2$, and disconnect $H_2$ is open. In the stationary state when the entire load current is derived from tap $F_1$ and carried by contacts $D_1$ thyristors $Th_1$ are not conductive, and disconnect $H_1$ may be closed, as mentioned above. Disconnect $H_1$ may, however, be opened if it is desired not to subject thyristors $Th_1$ for long periods of time to a difference in voltage. If disconnect $H_1$ should be in the open position while the load current is derived from tap $F_1$, then disconnect $H_1$ must be closed preparatory to a tap-changing operation from tap $F_1$ to tap $F_2$ prior to separation of current-carrying contacts $D_1$.

Reference characters $R_1$, $R_2$ have been applied to indicate a pair of current-limiting resistors each shunted by an electric fuse $S_1$ and $S_2$, respectively. Parts $R_1$, $S_1$ are connected in series with thyristors $Th_1$ and parts $R_2$, $S_2$ are connected in series with thyristors $Th_2$. During a tap-changing operation both disconnects $H_1$, $H_2$ must be closed. If both disconnects $H_1$, $H_2$ are closed and the networks including thyristors $Th_1$ and $Th_2$ are both conductive on account of a fault consisting in simultaneous triggering of the thyristors $Th_1$ and $Th_2$ in both thyristor networks, this would result in short-circuiting the portion of the tapped transformer winding situated between taps $F_1$ and $F_2$. To prevent the ensuing short-circuit currents to reach dangerous magnitudes current-limiting resistors $R_1$, $R_2$ and shunt fuses $S_1$, $S_2$ are provided. On occurrence of a fault of the aforementioned kind, resulting in a short-circuit of the portion of the transformer winding situated between taps $F_1$, $F_2$ electric fuses $S_1$, $S_2$ will blow, and resistors $R_1$, $R_2$ then limit the fault current to a permissible magnitude.

A tap-changing operation from tap $F_1$ to tap $F_2$ calls for closing of both disconnects $H_1$ and $H_2$. Thyristors $Th_1$ are triggered by the central trigger control unit St, and establish a current path parallel to the current path I including current-carrying contacts $D_1$. These contacts are then opened, and thyristors $Th_1$ and disconnect $H_1$ carry the entire load current for a short period of time. Thereupon thyristors $Th_2$ are triggered by the central control unit St and no more trigger pulses are supplied to thyristors $Th_1$. As a result, a current path is established from tap $F_2$ to outgoing line LA which includes thyristors $Th_2$ and closed disconnect $H_2$. At the next natural zero of the load current thyristors $Th_1$ become nonconductive, causing cessation of the current flow through disconnect $H_1$. As a result of the above, the current in line LA is now derived only from tap $F_2$, and not derived any longer from tap $F_1$. Thereupon current-carrying contacts $D_2$ are closed and disconnect $H_1$ is, or may be, opened. After closing of current-carrying contacts $D_2$ thyristors $Th_2$ are rendered inoperative by the action of central trigger pulse control St.

The above steps are reversed when a tap-change from tap $F_2$ to tap $F_1$ is intended to be effected.

If the central trigger pulse control St fails and no trigger pulses are applied to thyristors $Th_1$ and $Th_2$, the current initially flowing in line I and current-carrying contacts $D_1$ cannot be commutated to the parallel circuit including thyristors $Th_1$ and closed disconnect $H_1$.

In systems of the kind under consideration contacts $D_1$, $H_1$, $H_2$ and $D_2$ are operated automatically in the required sequence. Therefore a tap-changing operation from tap $F_1$ to tap $F_2$ is automatically completed.

In the drawing reference numeral ZG has been applied to indicate an auxiliary or standby trigger pulse control unit for thyristors $Th_1$, $Th_2$ intended to become operative when, and in case that, trigger pulse control unit St fails. Trigger pulses for thyristors $Th_1$ derived from trigger pulse control unit St are transmitted to thyristors $Th_1$ by the intermediary of trigger pulse transformer $SW_1$ and trigger pulses for thyristors $Th_1$ derived from standby pulse control unit ZG are transmitted to thyristors $Th_1$ by the intermediary of trigger pulse transformer $SW_3$. Reference character $SW_2$ has been applied to indicate a trigger pulse transformer for transmitting trigger pulses derived from unit St to thyristors $Th_2$ and reference character $SW_4$ has been applied to indicate a pulse transformer for transmitting trigger pulses derived from unit ZG to thyristors $Th_2$.

Each trigger pulse transformer $SW_1$, $SW_2$ has one primary winding connected to unit $St_1$, two secondary windings each connected to one of thyristors $Th_1$ and $Th_2$, respectively, and a tertiary winding which will be considered below. Each of the trigger pulse transformers $SW_3$, $SW_4$ has a primary winding connected to unit ZG and two secondary windings each connected to one of thyristors $Th_1$ and $Th_2$, respectively. The trigger circuits $Z_1$ of thyristors $Th_1$ further include diodes $G_1$, resistors $W_1$ and $W_{11}$ and capacitors $C_1$. The trigger circuits $Z_2$ of thyristors $Th_2$ include diodes $G_2$, resistors $W_2$ and $W_{12}$ and capacitors $C_2$. Resistors $W_{11}$, $W_{12}$ are current-limiting resistors. Capacitors $C_1$ and $C_2$ are shunted across the secondary windings of trigger pulse transformers $SW_1$ and $SW_2$, respectively. The presence of diodes $G_1$, $G_2$ in the gate circuits of thyristors $Th_1$, $Th_2$ precludes the occurrence of trigger pulses of wrong or negative polarity to said thyristors or, in other words, diodes $G_1$, $G_2$ rectify the output of transformers $SW_1$, $SW_2$. The auxiliary trigger circuits for thyristors $Th_1$, $Th_2$ which include the secondary windings of transformers $SW_3$, $SW_4$ further include diodes $G_5$, $G_6$. It will be apparent that thyristors $Th_1$, $Th_2$ may be triggered selectively either by unit St and transformers $SW_1$, $SW_2$, or by unit ZG and transformers $SW_3$, $SW_4$.

The circuits of the tertiary windings of transformers $SW_1$, $SW_2$ include diodes $G_3$, $G_4$ to rectify the output of these tertiary windings and capacitors $C_3$, $C_4$ to increase the output voltage thereof, while Zener diodes $Z_5$, $Z_6$ operate as voltage stabilizers.

The circuit of the primary winding of transformer $SW_3$ includes the normally open contacts $d_{11}$ of a relay $d_1$ and the circuit of the primary winding of transformer $SW_4$ includes the normally open contacts $d_{12}$ of a relay $d_2$. Relays $d_1$ and $d_2$ may be energized by power supplies $Sp_1$ and $Sp_2$, respectively, which are a pair of transformers, when switches $a_1$ and $a_2$, respectively, are closed. When trigger pulse control unit St is properly operating, the trigger pulses thereof induce in the tertiary windings of trigger pulse transformers $SW_1$ and $SW_2$ emfs which buck the emfs of the power supplies or transformers $Sp_1$ and $Sp_2$ and thus preclude energization of relays $d_1$ and $d_2$, respectively, closing of contacts $d_{11}$ and $d_{12}$, respectively, and energization of trigger pulse standby transformers $SW_3$ and $SW_4$, respectively, by the standby trigger pulse control unit ZG.

A tap-changing operation from tap $F_1$ to tap $F_2$ is initiated by closing disconnect contacts $H_1$ preparatory to shunting current path I by thyristors $Th_1$. Simultaneously with closing of disconnect contacts $H_1$ contact $a_1$ is closed and the operation of trigger pulse generator or trigger pulse control unit St is initiated. There are two different courses of action depending upon whether or not trigger pulse generator or trigger pulse control unit St triggers thyristors $Th_1$ by the intermediary of trigger pulse transformer $SW_1$. If units St and $SW_1$ properly trigger thyristors $Th_1$, the voltage of power supply or transformer $Sp_1$ is bucked, relay $d_1$ remains unenergized, its contacts $d_{11}$ remain open and units ZG and $SW_3$ remain inoperative. In case that units St and $SW_1$ fail to trigger thyristor $Th_1$, no voltage is induced in the tertiary winding of trigger pulse transformer $SW_1$. Hence transformer or power supply $Sp_1$ energize relay $d_1$, causing closing of the contacts $d_{11}$ thereof and triggering of thyristors $Th_1$ by the intermediary of standby units ZG and $SW_3$.

Switch $a_2$, power supply or transformer $Sp_2$, the tertiary winding of trigger pulse transformer $SW_2$, relay $d_2$ and its contacts $d_{12}$ cooperate to connect standby trigger pulse unit ZG to standby trigger transformer $SW_4$ in case that trigger pulse control unit St and trigger pulse transformer $SW_2$ should fail to timely trigger thyristors $Th_2$ during a tap-changing operation from tap $F_1$ to tap $F_2$. During such an operation disconnect $H_2$ is closed preparatory to applying trigger pulses to thyristors $Th_2$.

A tap-changing operation from tap $F_2$ to tap $F_1$ involves, in essence, the same steps in reverse as a tap-changing operation from tap $F_1$ to tap $F_2$.

The operation of the forced or standby triggering means depends upon a failure of trigger pulse control St to trigger thyristors $Th_1$ or $Th_2$, respectively. Parting of contacts $D_1$, $D_2$ is delayed until after the operativeness of units St, $SW_1$ and $SW_2$ has been tested and, in case of failure thereof, standby units ZG $SW_3$ and SW are operated.

The essential difference between the circuitry shown in FIG. 3 of U.S. Pat. No. 3,786,337 and the circuitry embodying the present invention consists in the substitution of power supplies or transformers $Sp_1$ and $Sp_2$ for the battery or constant voltage d-c power supply shown in the above figure of the above patent and designated therein by the reference character Sp.

In a system of the kind under consideration there occurs a load current and a circulating current. If the load current is relatively small, the amplitudes and phases of these currents may be opposed at the very moment that a transfer of the load from one tap of the transformer winding to another tap thereof is effected. In other words, under such conditions the resulting current in branches I, II may be zero and the voltage across thyristor networks $Th1$, $Th2$ zero. The operation of trigger pulse control unit St depends upon the presence of a voltage drop across branches I, II at the time a tap-changing operation is effected. If there is no such voltage across one of both branches, the thyristors of the other of the branches are not triggered. Thus both pairs of thyristors $Th_1$, $Th_2$ may be blocking during a period of time corresponding to several half cycles, and yet a load current continues to flow uninterruptedly.

If such a situation occurs in the circuitry of FIG. 3 of U.S. Pat. No. 3,786,337, the relays $d_1$, $d_2$ would be energized by battery Sp, causing closing of switches $d_{11}$, $d_{12}$ and triggering of thyristor networks $Th_1$, $Th_2$ by pulse control unit ZG, resulting in shortcircuiting of winding section Tr. To put it in other words, in a situation of the contemplated kind the failure of pulse control unit St to transmit trigger pulses to thyristor networks $Th_1$, $Th_2$ is in order, and activation of standby pulse control unit ZG leads to a defect, namely a short-circuit.

Activation of the standby pulse control unit ZG generally causes emission of a fault warning signal by conventional signalling means. It is common practice when testing the tap-changing circuitry as such to disconnect the same from transformer winding Tr, i.e. to de-energize taps $F_1$, $F_2$ and to test the tap-changing circuitry in that condition. In that condition no currents flow through lines I and II, and no voltages occur across thyristor networks $Th_1$, $Th_2$, and consequently pulse control unit St does not emit trigger pulses to these networks. In the circuitry of FIG. 3 of U.S. Pat. No. 3,786,337 this causes the standby pulse control unit ZG to become operative, simultaneously causing emission of fault warning signals though the system, in fact, operates faultlessly.

The present system is not subject to the aforementioned limitations.

The units or transformers indicated by reference characters $Sp_1$, $Sp_2$ have two functions. They are both voltage sensors and power supplies. Reference characters $X_1$ and $X_2$ have been applied to indicate a pair of resistors each shunted across one of thyristors $Th_1$, $Th_2$. Line $1_1$ connects voltage sensor $Sp_1$ to resistor $W_4$ of trigger pulse transformer $SW_2$ and line $1_2$ connects voltage sensor $Sp_2$ to resistor $W_3$ of trigger pulse transformer $SW_1$. The voltages derived from sensors $Sp_1$, $Sp_2$ are opposite to those generated in the tertiary windings of trigger pulse transformers $SW_2$ and $SW_1$.

Under normal conditions the circuitry performs as outlined above. To be more specific, disconnect contact $H_1$ and auxiliary contact $a_1$ are closed simultaneously and pulse control unit St is caused to energize transformer $SW_1$ which triggers thyristor network $Th_1$. The voltage pulses generated in the tertiary winding of transformer $SW_1$ and in voltage sensor $Sp_2$ cancel each other out so that relay $d_1$ remains unenergized and switch $d_{11}$ remains open.

Assuming now that pulse control unit St is defective and does not trigger thyristor network $Th_1$. Hence no voltage is generated in the tertiary winding of trigger pulse transformer $SW_1$ to cancel the external voltage that is applied to the circuit thereof and this results in the energization of relay $d_1$, closing of switch $d_{11}$ and triggering of thyristors $Th_1$ by the intermediary of transformer $SW_3$ by pulses derived from auxiliary or standby unit ZG.

The circuitry operatively related to tap $F_2$ is the same as that operatively related to tap $F_1$. Hence a failure of unit St causes energization of relay $d_2$ upon closing of auxiliary switch $a_2$, closing of switch $d_{12}$ and energization of auxiliary trigger transformer $SW_4$ by unit ZG.

Substantially the same events occur in case of a tap-changing operation from tap $F_2$ to tap $F_1$.

Considering now an instance involving a very small load current whose amplitudes and phase relations are opposite to the circulating current at the instant the tap-changing operation is effected. Under such conditions there is no voltage drop across the non-current-carrying thyristors $Th_1$ and unit St fails to trigger thyristors $Th_1$ as well as thyristors $Th_2$. Consequently both pairs $Th_1$ and $Th_2$ of thyristors are non-conducting for a short interval of time, yet an uninterrupted load current continues to flow. In that instance voltage sensors $Sp_1$ and $Sp_2$ are not energized and consequently their voltage output is zero. Hence relays $d_1$ and $d_2$ are not energized, do not close switches $d_{11}$ and $d_{12}$, and standby unit ZG does not energize trigger transformers $SW_3$ and $SW_4$.

Assuming that relays $d_1$, $d_2$ were not adapted to be energized by voltage sensors $Sp_1$, $Sp_2$, but by an auxiliary constant voltage source as, for instance, a battery. The voltage derived from a constant voltage source would energize relays $d_1$, $d_2$ upon closing of switches $a_1$, $a_2$ in the absence of generation of a compensating voltage in the tertiary windings of trigger transformers $SW_1$, $SW_2$. This, in turn, would result in improper energization of trigger transformers $SW_3$ and $SW_4$ by unit ZG.

I claim as my invention:

1. Tap-changing means for transformers having thyristors for effecting tap-changes including in combination
    a. tapped transformer winding means having a pair of taps;
    b. a load-current-carrying line;
    c. transfer switch means including two pairs of cooperating relatively movable current-carrying contacts for selectively connecting each of said pair of taps to said line, and two pairs cooperating relatively movable disconnect contacts;
    d. two pairs of inverse parallel connected thyristors, each said pairs of thyristors being arranged to shunt one pair of said two pairs of current-carrying contacts in the closed position of one pair of said two pairs of disconnect contacts;
    e. a pair of current-limiting resistors each shunted by an electric fuse, each of said pair of current-limiting resistors and the shunting fuse thereof being arranged in series with one of said two pairs of thyristors;
    f. means for sequentially triggering said two pairs of thyristors for performing a tap-changing operation, said triggering means including a pair of trigger transformers each for triggering one pair of said two pairs of thyristors, and each of said pair of trigger pulse transformers having a tertiary winding;
    g. standby trigger means for each of said two pairs of thyristors;
    h. a pair of relays each responsive to a failure of said means for sequentially triggering said two pairs of thyristors and each controlling said standby triggering means of one of said two pairs of thyristors;
    i. a pair of auxiliary switch means jointly operated with one of said two pairs of current-carrying contacts, each controlling the energizing circuit of one of said pair of relays;
    j. two electric networks each energized by said tertiary winding of one of said pair of trigger pulse transformers and each energizing one of said pair of relays; and
    k. a pair of voltage sensors each sensing the voltage across one of said pair of thyristors, each bucking the voltage generated in said tertiary winding of one of said pair of trigger pulse transformers, and each energizing one of said pair of relays in the absence of an emf being generated in said tertiary winding in one of said pair of trigger pulse transformers.

2. Tap-changing means for transformers having thyristors for effecting tap changes including in combination
    a. tapped transformer winding means having at least one pair of taps;
    b. a load-current-carrying line;
    c. transfer switch means including two pairs of cooperating relatively movable current-carrying contacts for selectively connecting each of said pair of taps to said line and two pairs of cooperating relatively movable disconnect contacts;
    d. two pairs of inverse parallel connected thyristors, each of said pair of thyristors being arranged to shunt one of said pair of current-carrying contacts in the closed position of one of said two pairs of disconnect contacts;

e. principal triggering means for sequentially triggering said two pairs of thyristors when effecting a tap-changing operation, said principal triggering means including a pair of trigger pulse transformers each having a primary winding, a pair of secondary windings supplying trigger pulses to one of said pairs of thyristors, and a tertiary winding generating voltages tending to energize said pair of relays;

f. standby triggering means for each of said two pairs of thyristors, said standby triggering means including a standby trigger pulse generator, a pair of standby trigger pulse transformers each having a primary winding energized by said standby trigger pulse generator and a pair of secondary windings supplying standby trigger pulses to one of said pairs of thyristors;

g. a pair of relays each responsive to a failure of said principal triggering means and each controlling the circuit of said primary winding of one of said standby trigger pulse transformers;

h. a pair of auxiliary switch means jointly operated with one of said two pairs of current-carrying contacts each controlling the energizing circuit of one of said pair of relays;

i. means for precluding the flow of excessive currents upon triggering of said pairs of thyristors by said stand-by triggering means, said excessive current precluding means including a pair of current-limiting resistors each arranged in series with one said two pairs of thyristors and each shunted by an electric fuse; and j. a pair of a-c power supplies tending to energize said pair of relays in the closed positions of said pair of auxiliary switch means, each of said power supplies tending to buck said voltage generated in said tertiary winding of one of said pair of trigger pulse transformers, and each of said power supplies being in the form of a transformer whose output is proportional to the voltage prevailing across one of said pair of thyristors.

* * * * *